United States Patent [19]

Shaw

[11] 3,765,771

[45] Oct. 16, 1973

[54] LIQUID BORNE PARTICLE SENSING METHOD USING AEROSOLIZING TECHNIQUES

[75] Inventor: Clyde C. Shaw, Los Altos Hills, Calif.

[73] Assignee: Coulter Electronics, Inc., Hialeah, Fla.

[22] Filed: Oct. 27, 1971

[21] Appl. No.: 184,271

Related U.S. Application Data

[63] Continuation of Ser. No. 846,712, Aug. 1, 1969, abandoned.

[52] U.S. Cl............ 356/103, 250/218, 250/222 PC, 356/36
[51] Int. Cl. ......................................... G01n 21/26
[58] Field of Search...................... 250/218, 222 PC; 356/36, 37, 39, 40, 102–104, 208

[56] References Cited

UNITED STATES PATENTS

| 3,398,286 | 8/1968 | Ford et al. ...................... 356/103 X |
| 3,462,609 | 8/1969 | Beattie............................ 356/103 X |
| 3,084,592 | 4/1963 | Scott................................... 356/208 |

Primary Examiner—David Schonberg
Assistant Examiner—F. L. Evans
Attorney—I. Irving Silverman et al.

[57] ABSTRACT

A sample in a liquid is nebulized into an aerosol so that the particles in the sample are continuously aerosolized. The aerosol is then run through an optical particle sensor to count the particles.

11 Claims, 3 Drawing Figures

PATENTED OCT 16 1973          3,765,771
FIG_1
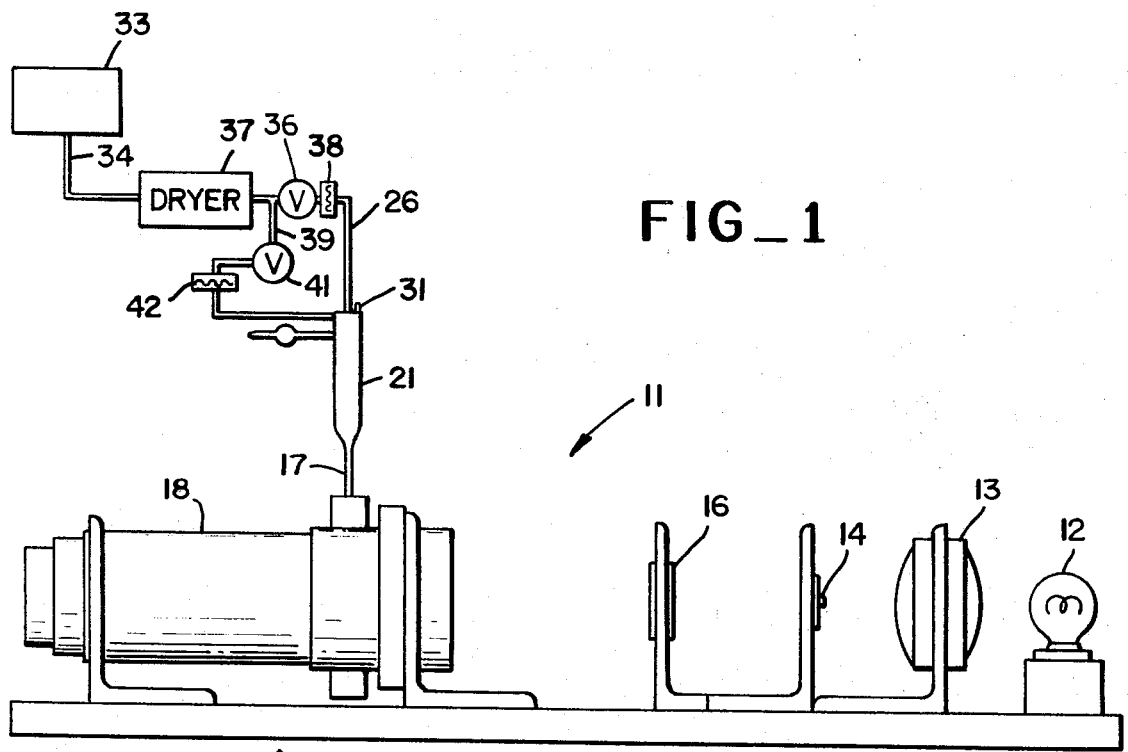
FIG_2
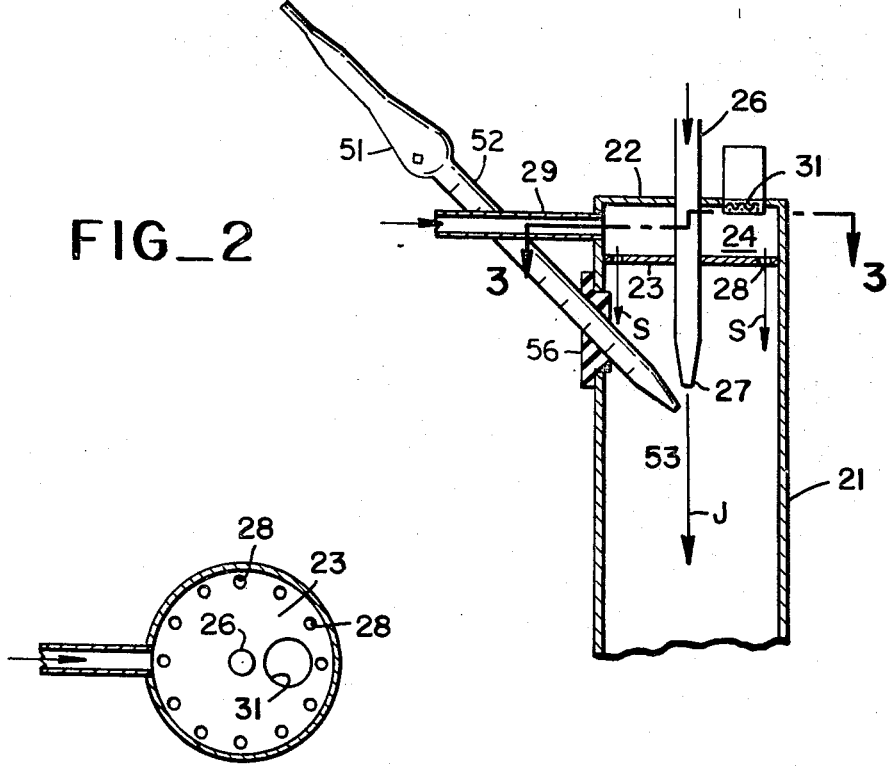
FIG_3

LIQUID BORNE PARTICLE SENSING METHOD USING AEROSOLIZING TECHNIQUES

This is a continuation of application Ser. No. 846,712 filed on Aug. 1, 1969, now abandoned.

The present invention relates to an optical particle sensor of the kind that operates on the principle of measurement of the amount of light which is scattered when an intense illuminating beam is projecting through a flow stream containing suspended particles. The present invention relates particularly to a method of and apparatus for using an aerosol sensor of this kind to count cells in a blood sample, although it can equally well be applied to any liquid sample containing particles.

Cell counts of red cells and white cells are used extensively in medical practice. A high degree of accuracy is always desired. However, the characteristics of blood itself create problems in obtaining highly accurate counts with prior art counting techniques and equipment.

In one cubic millimeter of normal blood there are approximately $10^7$ red cells. It has therefore been necessary to dilute the sample quite strongly to be able to count the cells in a reasonable amount of time with prior art techniques.

Cells in a blood sample are often counted by using a microscope. The results of counts using a microscope are somewhat subjective. The results depend to a large extent on the individual making the count. The results may not be satisfactorily reproducible.

The microscope technique requires a large amount of dilution of the sample. The more the sample is diluted, the less accurate the count is likely to be. The amount of diluent has to be measured at each step of the dilution, and inaccuracies are naturally apt to occur in the measurements of the amounts of the diluent, thus compounding the errors.

Another prior art cell counting technique has used an instrument which measures cell volume. An instrument of this kind requires an aperture which is small. The aperture has a tendency to plug up. Cell counts made on such instruments have also required high dilution ratios.

It is the primary object of the present invention to count particles suspended in a liquid sample by an aerosol measurement technique. In particular, the application is suitable for blood cell counting and in the description contained in this disclosure specific reference will be made to a blood cell counter. This should not be construed as a restrictive application of the principle being described but only as a particular example of its general utility.

The dilution needed in an aerosol measurement technique is much less than in the prior art liquid measurement techniques. This is true because the aerosol technique is capable of counting more particles per unit time (as a result of its higher flow rate capabilities). This gives better statistics. The viscosity of air is insignificant. The viscosity of liquid is considerable. Because liquid has considerable viscosity, there may be a problem of cavitation and or turbulence when the speed of sample flow is increased beyond a certain limit.

The aerosol technique permits greater sensitivity and can cover a much broader range of particle sizes than the prior art liquid automatic counting techniques could cover.

With the aerosol technique it is possible to measure everything from small bacteria to the large cells that get into the blood stream from the bone. Bacteria normally range in size from one-half micron to 5 microns. Platelets (coagulate materials in the blood) range in size from 1 to 4 microns in diameter. The red cells are about seven microns in diameter. The white cells are from seven to twenty or thirty microns in diameter. Some cells in the bone that can get into the blood can range up to 50 microns. With the aerosol technique, it is possible to cover this entire range of particle sizes without having to perform instrumental changes.

In the present invention a pipette contains the mixed blood and diluent in its calibrated bore. The open end of this bore of the pipette is disposed closely adjacent to an air jet of warm, dry, filtered air. This jet serves a dual purpose: (1) the jet drys the film of liquid residing on the particles and reduces the size of any liquid drops that are nebulized below the limit of detection by the sensor; (2) the jet also draws the diluted blood sample from the pipette to nebulize the sample and to conduct the resulting aerosol through a flow tube to a high intensity beam of focussed light in the sensor. As the cells pass through this focussed beam some of the light is scattered, and this scattered light is measured in a conventional manner to determine the particle size and number concentration of the blood cells, or other particles, in the blood sample.

In a preferred form of the present invention warm dry sheath air is directed into the drier tube of the nebulizer to shield the particles from contact with the walls of the drier tube. This insures that all of the particles in the blood sample pass through the sensor and are counted.

The manner in which the calibrated pipette is used with the sensor permits an exact amount of sample to be run through the sensor. A constant aerosol volume flow rate and nebulization rate is maintained in order that the count rate is maintained at a constant value.

The pipette is disposable. It can be used once and thrown away.

Since the particles in the sample never contact the structure of the sensor, no clean up is required with this aerosol technique.

An optical aerosol particle sensor constructed and operated as described above to make aerosol measurements of blood samples and to produce the results described above constitute further specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings;

FIG. 1 is a side elevation view of an optical aerosol particle counter constructed in accordance with one embodiment of the present invention;

FIG. 2 is a fragmentary enlarged view, partly in cross-section, showning details of the manner in which the pipette containing the blood sample is associated with a main jet to make an aerosol of the blood sample; and FIG. 3 is a fragmentary view taken along the line and in the direction indicated by the arrows 3—3 in FIG. 2 and shows details of an orifice arrangement for introducing a sheath air flow around the aerosol.

In FIG. 1 an optical aerosol particle sensor constructed in accordance with one embodiment of the present invention is indicated generally by the reference numeral 11.

The sensor 11 includes a light source 12, a collecting lens system 13, an aperture 14 (which is dimensioned to pass just the image of the filament of the light source 12), a projection lens 16, a flow tube 17, and a photo multiplier tube 18.

The photo multiplier tube 18 is mounted end-on (in axial alignment) with the axis of the focussed illuminating beam. The photo multiplier tube has a glass end surface. The light which is scattered when the illuminating beam strikes a suspended particle (conducted into the sensor by the flow tube 17) is transmitted through the glass end of the photo multiplier tube. The intensity of this scattered light is measured by electronic circuitry in the sensor 11. The photo multiplier tube 18 thus forms a part of the light measuring means which measure the amount of scattered light.

The intensity of the scattered light indicates the particle size.

The principle and technique of operation of an aerosol particle sensor as thus far described is well known and will not be further described in this application. The specific design of the sensor unit is only intended as an example of one of the several possible designs which may be used.

With aerosol particle sensors of this kind it is possible to make highly accurate counts of any size of particles in a sample flow within the range capabilities of the instrument. An aerosol particle sensor has the range capability to count, without the necessity to make any adjustments or changes to the machine, all sizes of particles which might be present in a blood sample. The sensor can count particles ranging in size from small bacteria of one-half micron to large bone cells of up to 50 microns.

The present invention is specifically directed toward apparatus and a technique for making an aerosol of the blood sample in a manner such that the arosol can be run through the particle sensor 11.

In accordance with the present invention a tube drier 21 is formed integral with or suitably attached to the flow tube 17. The upper end of the tube 21 is closed by a cap 22. A plate 23 extends across the interior of the tube 21 below the cap so as to provide a chamber or plenum 24. A small tube 26 extends through the cap 22 and the plate 23 and may have a nozzle 27 at its end.

The plate 23 has a series of small diameter openings 28 extending through the plate. The openings 28 are arranged in an annulus (as best illustrated in FIG. 3) and act as orifices to distribute a wall or sheath of air around the inside surface of the tube 21.

The warm filtered dry air, or other gaseous fluid, flowing through the orifices 28 can be admitted to the chamber 24 either through a tube 29 or through an opening 31, depending on the flow requirements needed for a particular run, as will be described in more detail below.

The amount of air, or other gaseous fluid flowing through the tube 26 and the tube 29, is controlled; and FIG. 1 shows one arrangement for achieving this control. As shown in FIG. 1, a pump 33 pumps air through a conduit 34. A valve 36 controls the amount of air flowing through the conduit 26. A heater and drier 37 is connected in the conduit 34 to remove moisture from the air in the conduit. A filter 38 removes all particles from the air before the air flows into the tube 26.

A branch conduit 39, valve 41 and filter 42 tap a regulated quantity of air from the conduit 34 for flow through the tube 29.

In the preferred form of the present invention the means for making an aerosol blood sample include a pipette 51. The pipette is associated with the tube 21 and the nozzle 27 in a way to form a jet pump which acts as a nebulizer.

As shown in FIG. 2 the pipette 51 includes a calibrated hollow bore portion 52 which holds the blood sample. The hollow bore portion has an open end 53 located closely adjacent the nozzle 27 so that the jet of air J flowing out of the nozzle continually draws the blood sample out of the pipette by a jet pump or venturi action. The resulting aerosol flows down the tube 21 where residual liquid is evaporated, and into the sensor 11. The exact amount of the blood sample drawn out of the pipette can be visually determined by the calibrations on the hollow bore 52 so that an exact amount of blood sample can be run through the sensor, if required.

The sheath air flow (indicated by the arrows S in FIG. 2) coming out of the orifices 28 forms a wall of air between the aerosol and the inside surface of the flow tube. This shields the particles in the suspended sample from contact with the wall of the flow tube and insures that all the particles in the blood sample are run through the sensor and are counted.

To make sure that there is no turbulence and no contact of the particles with the flow tubes there must be as isokinetic flow of the aerosol and the sheath air. In some cases this can be established by air flow through the filter inlet 31 only. In other cases it may be necessary to use a valve arrangement like that shown in FIG. 1 to establish a proper flow relation between the fluid flow in the tubes 26 and 29.

There are a number of ways of selectively counting the desired particles in the blood sample. The red cells can be discriminated from the platelets and white cells, on an approximate basis, by measuring the size distribution curve. For a more accurate red cell count, the whole blood can be counted while discriminating against the platlets because of the small size of the platelets.

In a white cell count, the red cells can be eliminated by hemolizing. Thus the white cell count can be determined in a two count operation.

The aerosol measurement technique of making blood cell counts has a further advantage in that no clean-up of the instrument is required after the count has been made. As can be seen with reference to FIG. 2, the pipette 51 can be withdrawn from the sensor 11 merely by withdrawing the stem 52 from the seal mount 56. And as noted above, since the sheath air flow S prevents contact of the blood sample particles with the structure of the sensor 18 or drier tube 21 no clean-up is required to remove such particles after an aerosol sample has been run.

An ultrasonic technique can also be used to generate the aerosol. In this ultrasonic technique the sound waves drive the particles out of the surface of the sample to make the particles airborne. The ultrasonic technique offers the option of using selective frequencies to drive certain sizes of particles selectively. The airborne cells thus driven off are then passed through the sensor.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method for counting and determining the cencentration of particles in a liquid sample comprising the steps of: introducing the liquid sample into a calibrated sample input means having an outlet which opens into a chamber at a point spaced from the walls of the chamber; passing a warm, dry, gaseous jet flow stream into the chamber and adjacent to said outlet of said input means for drawing a given amount of the liquid sample into the chamber, for nebulizing the given amount of liquid sample and thereafter for evaporating liquid on the particles in the given amount of sample so nebulized and also for drying liquid drops not containing particles to reduce the size thereof to a size below the size of drops detectable by a sensor to separate the particles in the given amount of liquid sample from the liquid thereof; transporting by means of said warm, dry, jet flow stream, the thus separated particles, in their thus separated form, directly into a beam of focused light, generating as a result of said transporting a quantum of forward light scattered energy which is directly proportional to the number and concentration of the particles in the given amount of liquid sample; measuring the given amount of the liquid sample drawn into the chamber from said sample input means; and measuring photoelectrically the generated quantum of light energy to determine the number and concentration of particles in the given amount of liquid sample.

2. The method defined in claim 1 including sheathing in a gaseous flow stream the thus separated particles for thereby shielding the particles from the chamber and any other related structure used for accomplishing said method.

3. The method defined in claim 2 including establishing isokinetic flow between the thus separate particles and the stream of sheathing gas to prevent turbulence in said chamber which would detract from the efficiency of said introducing, passing, drawing, separating, aerosolizing, drying, transporting and generating.

4. The method defined in claim 3 including controlling the duration of said passing of the jet stream and the flow rate of the jet stream for determining the total amount of sample being introduced into the chamber, whereby a precise count of the thus separated particles can be attained by said measuring.

5. The method of claim 1 including the step of measuring the intensity of the forward scattered light to determine the size of said particles and thereby the type of particles being sensed.

6. A method for counting and determining the concentration of particles in a liquid sample comprising the steps of: introducing the liquid sample into a chamber; separating said particles from the liquid portion of said liquid sample by subjecting the sample to ultrasonic waves to produce liquid drops and by drying the thus separated liquid drops to reduce the size of any liquid drops containing only liquid to a size below the size of drops detectable by a sensor and to evaporate liquid on particles in drops containing liquid and particles by introducing into the chamber a warm, dry, jet flow stream; transporting by means of said warm, dry, jet flow stream, the thus separated particles, in their thus separated form, directly into a beam of focused light, generating as a result of said transporting a quantum of forward light scattered energy which is directly proportional to the number and concentration of the particles in a known measurement of the liquid sample; and measuring photoelectrically such quantum of light energy.

7. The method defined in claim 6 including selecting the frequency of the ultrasonic sound waves to drive off certain predetermined sizes of particles from the liquid sample.

8. The method defined in claim 7 including sheathing in a gaseous flow stream the thus separated particles for thereby shielding the particles from the chamber and any other related structure used for accomplishing said method, and establishing isokinetic flow between the thus separated particles and the stream of sheathing gas to prevent turbulence in said chamber which would detract from the efficiency of said introducing, separating, drying, transporting, and generating.

9. An optical particle sensor for determining the size and concentration of particles carried in a liquid sample by measuring the forward scattering of a focused light beam projected through an aerosol of the liquid sample, said sensor comprising: a sample input chamber; fluid metering means arranged for introducing at its output a metered amount of the fluid sample into said input chamber; separating means for freeing the particles from the carrier liquid, said separating means including structure for producing a jet stream of warm, dry gas, and structure for passing said jet stream closely adjacent to said metering means output, whereupon a metered amount of the liquid sample is drawn into said input chamber and the liquid carrier thereof is separated from the particles and evaporated, leaving an aerosol stream of the particles in said input chamber; means for focusing an illuminating beam of light on a small portion of said warm, dry aerosol stream of particles; and photoelectric means for receiving and measuring the light forward scattered by the illuminated particles and for producing an output proportional to the size and concentration of the particles in the sample.

10. The sensor defined in claim 9 wherein said fluid metering means includes a pipette having its open outlet arranged as said metering means output so that the jet stream draws sample from the pipette to nebulize the liquid, and the amount of liquid sample withdrawn from the pipette can be determined visually by calibrations on the pipette.

11. The sensor defined in claim 9 including sheath means for introducing a gaseous flow stream between the aerosol stream of suspended particles and the walls of said input chamber to act as a sheath to shield the particles from contact with the walls of the chamber, said sheath means including a plenum upstream of said metering means output, means for introducing warm, dry gas into said plenum, and means for generating and projecting an annular sheath of such gas around the aerosol stream.

* * * * *